United States Patent
Noro et al.

[11] Patent Number: 6,032,091
[45] Date of Patent: Feb. 29, 2000

[54] ELECTRIC POWER STEERING APPARATUS

[75] Inventors: Yoshiki Noro; Yoshinobu Mukai, both of Wako, Japan

[73] Assignee: Honda Giken Kogyo Kabushiki Kaisha, Tokyo, Japan

[21] Appl. No.: 09/107,102

[22] Filed: Jun. 30, 1998

[30] Foreign Application Priority Data

Jul. 24, 1997 [JP] Japan .................................. 9-198983

[51] Int. Cl.[7] .................................................. B26D 5/04
[52] U.S. Cl. ............................ 701/42; 701/43; 180/443; 180/446
[58] Field of Search ................................. 701/41, 42, 43; 180/443, 446, 412, 413, 415, 422

[56] References Cited

U.S. PATENT DOCUMENTS

| | | | |
|---|---|---|---|
| 5,659,473 | 8/1997 | Noro et al. ................................. | 701/42 |
| 5,787,376 | 7/1998 | Nishino et al. ............................ | 701/41 |
| 5,809,438 | 9/1998 | Noro et al. ................................. | 701/43 |
| 5,889,376 | 3/1999 | Takatsuka et al. ........................ | 180/446 |
| 5,912,539 | 6/1999 | Sugitani et al. ........................... | 701/43 |
| 5,913,913 | 6/1999 | Okanoue et al. .......................... | 701/43 |
| 5,927,430 | 7/1999 | Mukai et al. .............................. | 701/41 |

FOREIGN PATENT DOCUMENTS

62-181958   8/1987   Japan .

*Primary Examiner*—Gary Chin
*Attorney, Agent, or Firm*—Merchant & Gould P.C.

[57] ABSTRACT

An electric power steering apparatus having a control unit for controlling a motor for applying an assist torque to a steering system on the basis of a steering torque of the steering system. The control unit has a drive signal fading part for generating a drive current signal on the basis of a deviation signal expressing the deviation between a target current set in correspondence with a steering torque and a detected motor current detected by a motor current detector and gradually decreasing a drive current value with time to zero when a fadeout request signal is supplied to it. Thus in an electric power steering apparatus constructed to gradually decrease a steering assist force being supplied from a motor when an ignition switch is turned off, even if an error arises in a detected motor current value as a result of a fall in the voltage of a battery power supply, the steering assist force can be decreased correctly.

4 Claims, 7 Drawing Sheets

ELECTRIC POWER STEERING APPARATUS

BACKGROUND OF THE INVENTION

1. Field of the Invention

The present invention relates generally to an electric power steering apparatus for applying power from an electric motor to a steering system to lighten the steering force that must be exerted by a driver, and more particularly to an electric power steering apparatus which when an ignition switch is switched off and the supply of a steering assist force is stopped causes the steering assist force to decrease gradually with time.

2. Description of the Related Art

Figure 4:
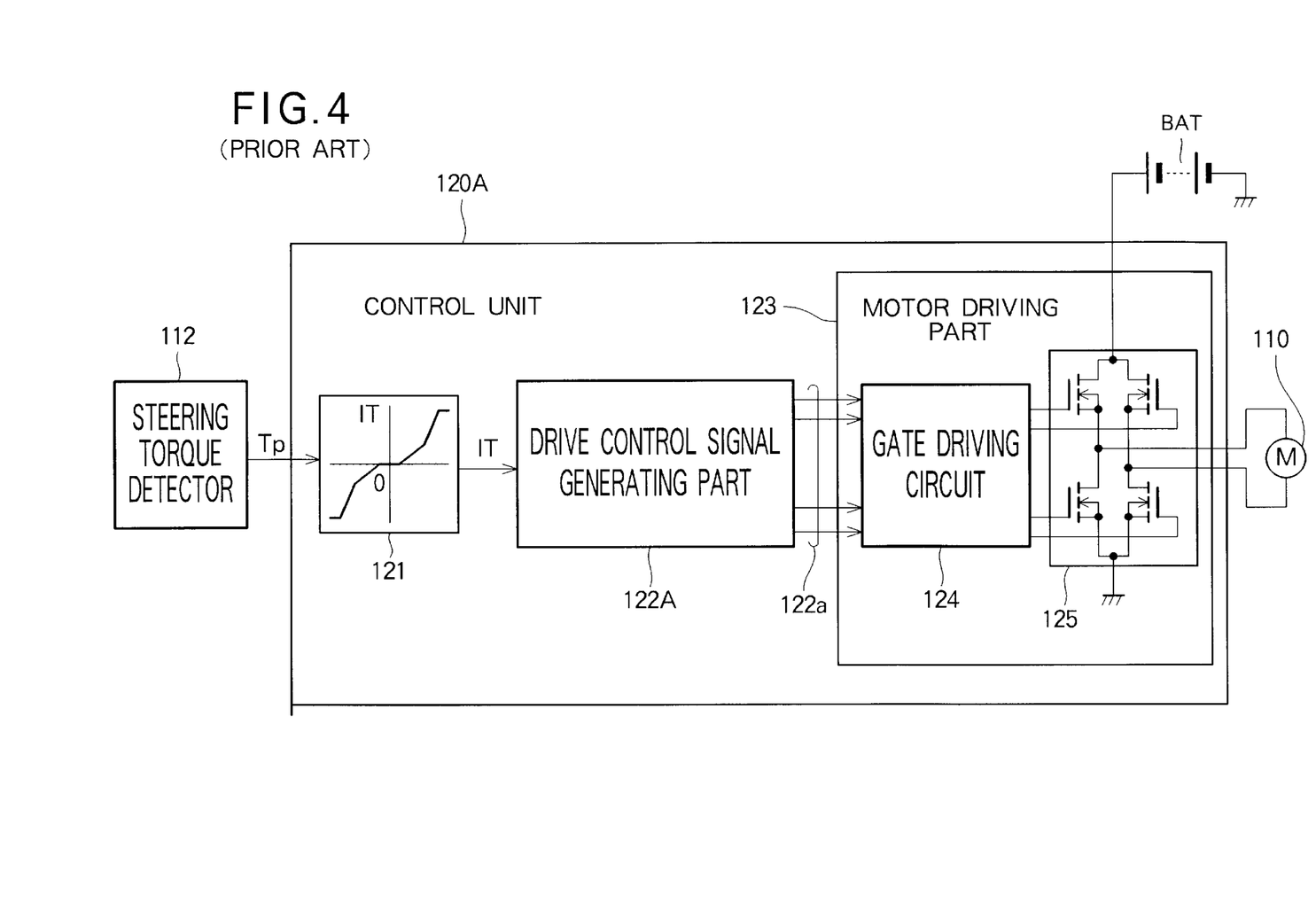
FIG. 4 is a block diagram of a related art control unit.

Reference is made to FIG. 4 hereof which shows in block diagram the construction of a control unit in a known electric power steering apparatus.

This control unit 120A has a target current calculating part 121, a drive control signal generating part 122A and a motor driving part 123. The target current calculating part 121 determines a target assist torque on the basis of a steering torque signal Tp outputted from a steering torque detector 112 and outputs a target current signal IT required for this target assist torque to be supplied from a motor 110 to a steering system. The drive control signal generating part 122A generates a PWM (Pulse Width Modulation) signal for PWM-operating the motor 110 on the basis of the target current signal IT, and outputs the generated PWM signal as a drive control signal 122a.

The motor driving part 123 has a gate driving circuit part 124 and a motor driving circuit 125 consisting of four power field effect transistors connected in an H-type bridge. The gate driving circuit part 124 drives the gates of the field effect transistors and thereby drives switching of the field effect transistors on the basis of the drive control signal (PWM signal) 122a. The control unit 120A PWM-controls power supplied from a battery power source BAT to the motor 110 on the basis of the steering torque signal Tp outputted by the steering torque detector 112 and thereby controls the output power (steering assist torque) of the motor 110.

Figure 5:
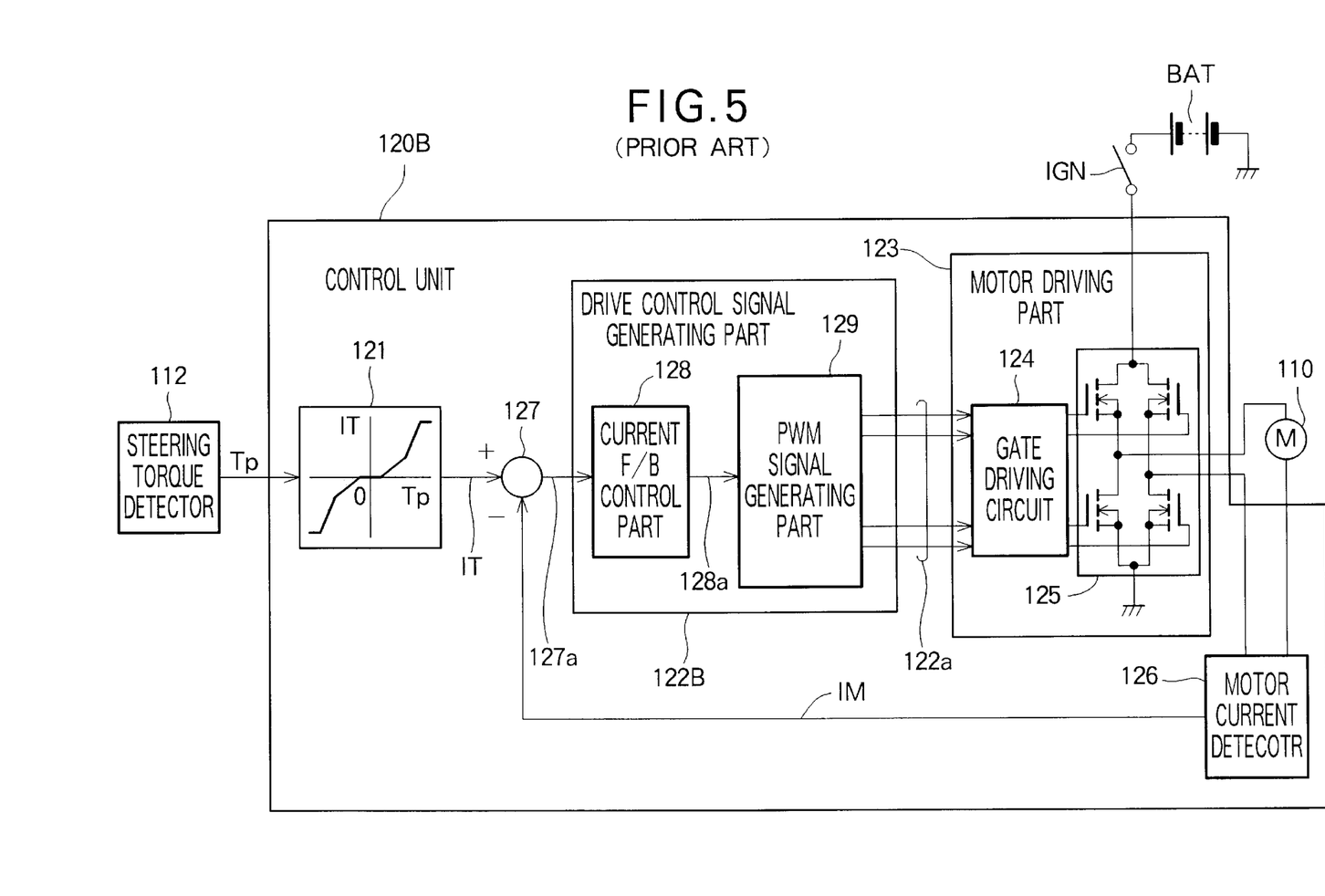
FIG. 5 is a block diagram of another related art control unit.

FIG. 5 hereof is a block diagram showing the construction of another known control unit.

In the control unit 120B shown in FIG. 5, the motor current IM actually supplied to the motor 110 is detected and the control characteristic of the motor 110 is improved by feedback control based on the motor current IM being carried out. In addition to the construction shown in FIG. 4, this motor current feedback control type control unit 120B has a motor current detector 126 for detecting the current flowing through the motor 110 and outputting a motor current signal IM, a deviation calculating part 127 for obtaining the deviation between the target current signal IT and the motor current signal IM, and a drive control signal generating part 122B for outputting a drive control signal 122a for driving the motor 110 based on a deviation signal 127a outputted from the deviation calculating part 127.

For the motor current detector 126, a detector which using a Hall device or the like detects the motor current flowing through an electric wire to the motor without cutting that wire or a detector which detects the motor current by amplifying and converting into a current a voltage produced across a low resistance for current detection is used.

The drive control signal generating part 122B comprises a current feedback (F/B) control part 128 for carrying out proportional, integral or differential processing or the like on the deviation signal 127a and generating and outputting a drive current signal 128a for so controlling the current supplied to the motor 110 that the deviation approaches zero and a PWM signal generating part 129 for generating a PWM signal for PWM-operating the motor 110 on the basis of the drive current signal 128a and outputting the generated PWM signal as a motor drive control signal 122a.

Because this motor current feedback control type control unit 120B so controls the operation of the motor 110 that the deviation between the target current signal IT and the motor current IM actually supplied to the motor 110 approaches zero, it can have increased control accuracy and responsiveness.

However, in the electric power steering apparatus described above, when an ignition switch IGN is switched off while the steering wheel is being operated, because the steering assist torque being supplied from the motor suddenly falls to zero, the steering wheel may be moved by a reaction from the tires, and this is undesirable. Also, when the ignition switch is switched off and the steering assist torque suddenly falls to zero, the steering wheel suddenly becomes heavy, and this may be disconcerting for the driver.

As a countermeasure to these problems, in Japanese Patent Laid-Open Publication No. SHO 62-181958, the present inventors have proposed an electric power steering apparatus with which when the ignition switch is switched off or a failure arises in the control unit, the steering assist torque supplied from the motor is reduced gradually (fadeout-controlled) and the steering force that must be applied to the steering wheel by the driver is thereby increased gently so that a good steering feel is obtained.

This electric power steering apparatus comprises a steering state detector for detecting a steering state of the steering system, a motor control signal generator for generating and outputting a motor control signal on the basis of a steering state detection signal from the steering state detector, and motor driving means for driving a motor on the basis of the motor control signal from the motor control signal generator, and also has an operation stoppage detector for detecting a stoppage in the operation of the apparatus itself and a corrector for causing the motor control signal to diminish gradually with time on the basis of a detection signal from the operation stoppage detector.

Figure 6:
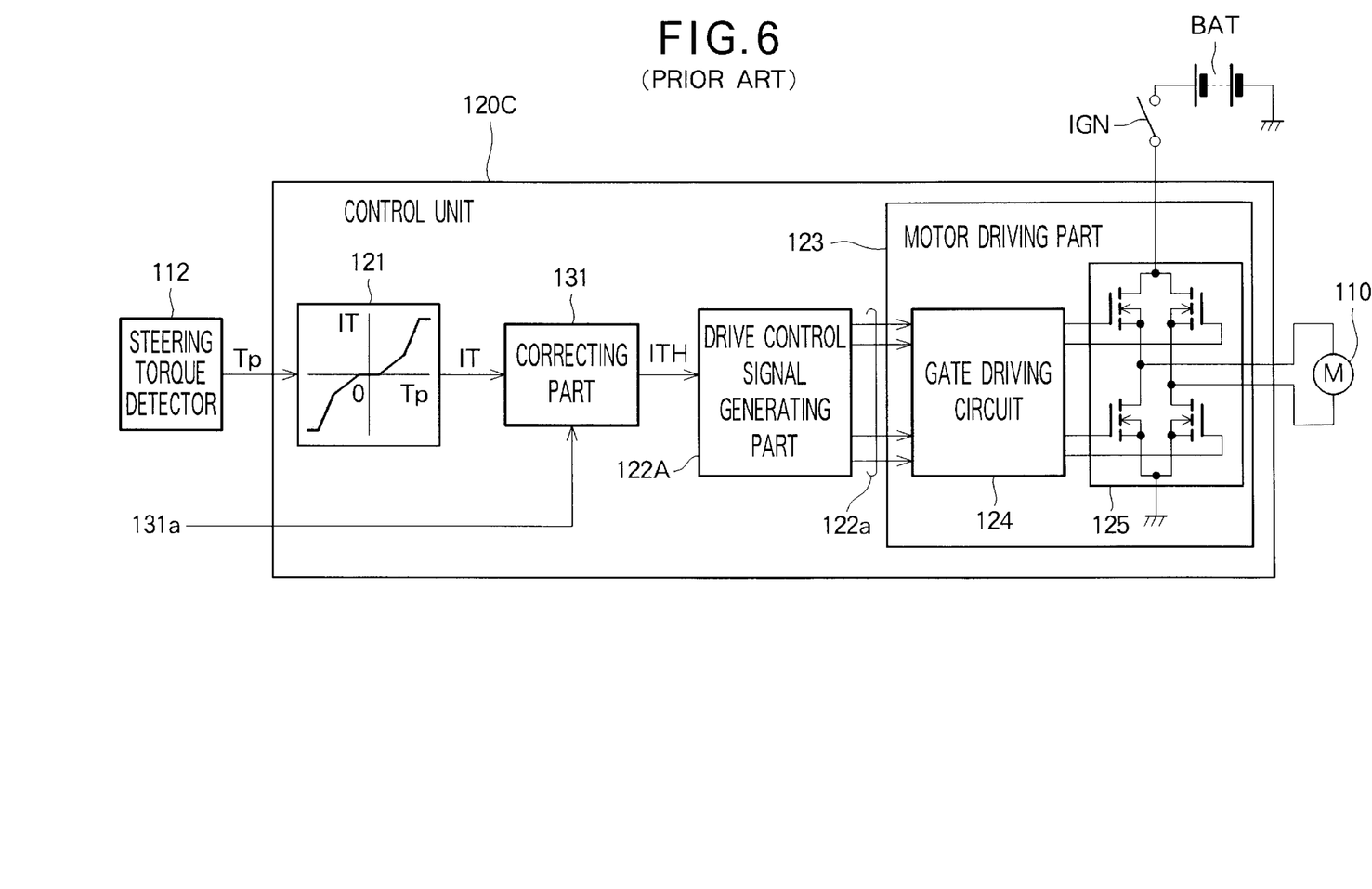
FIG. 6 is a block diagram of a related art control unit constructed to gradually decrease a steering assist torque supplied from a motor (to carry out fadeout control) at times such as when an ignition switch is switched off.

FIG. 6 hereof is a block diagram of a known control unit constructed to gradually reduce the steering assist torque supplied from a motor when an ignition switch is turned off (that is, to carry out fadeout control).

This control unit 120C consists of the control unit 120A shown in FIG. 4 with a correcting part 131 interposed between the target current calculating part 121 and the drive control signal generating part 122A. During normal operation, in which fadeout control is not carried out, this correcting part 131 feeds the target current signal IT supplied to it from the target current calculating part 121 unchanged to the drive control signal generating part 122A.

When the ignition switch IGN is turned off or when a failure of the control unit has been detected by a failure detecting part (not shown) or when it has been detected by a battery voltage monitoring part (not shown) that the voltage of the battery BAT is above a permissible upper limit value or is below a permissible lower limit value, a fadeout request signal 131a is supplied to the correcting part 131 from an ignition switch monitoring part (not shown) or the failure detecting part or the battery voltage monitoring part. When a fadeout request signal 131a is supplied to it, the correcting part 131 generates a corrected target current signal ITH in which the target current value supplied from the target current calculating part 121 is gradually reduced and finally reaches zero and supplies this corrected target current signal ITH to the drive control signal generating part 122A.

As a result, when the ignition switch IGN is switched off or when the battery voltage is outside a predetermined voltage range, the steering assist force supplied from the motor 110 can be gradually lowered and the steering wheel being moved by tire reactions and the steering feeling suddenly changing can thereby be lessened.

Figure 7:
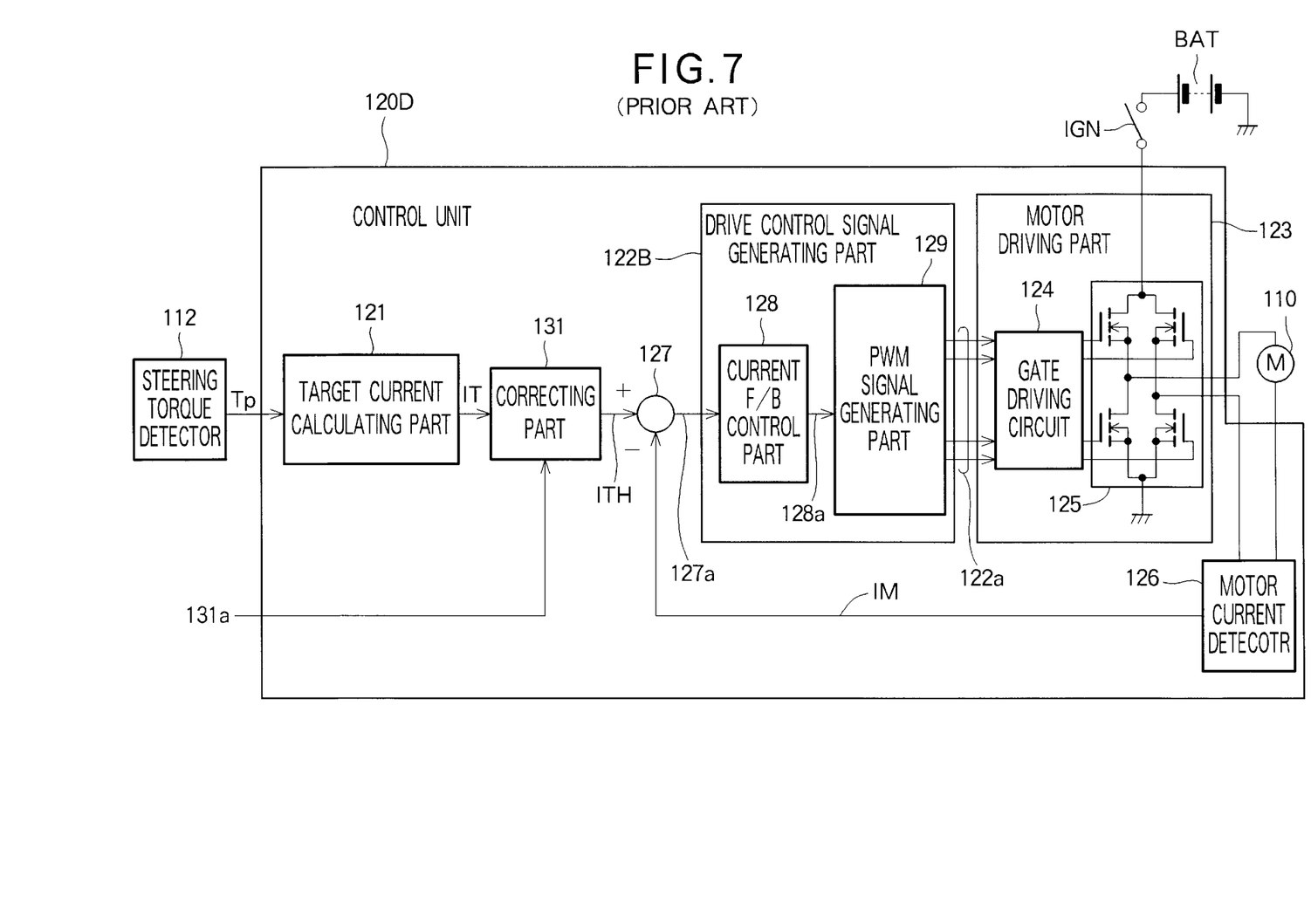
FIG. 7 is a block diagram of another related art control unit constructed to gradually decrease a steering assist torque supplied from a motor (to carry out fadeout control) at times such as when an ignition switch is switched off.

FIG. 7 hereof is a block diagram of another known control unit constructed to gradually reduce the steering assist torque supplied from a motor when an ignition switch is turned off (i.e. to carry out fadeout control).

This control unit 120D consists of the control unit shown in FIG. 5 with a correcting part 131 interposed between the target current calculating part 121 and the deviation calculating part 127. During normal operation, in which fadeout control is not carried out, this correcting part 131 feeds the target current signal IT supplied to it from the target current calculating part 121 unchanged to the deviation calculating part 127.

When the ignition switch IGN is turned off or when a failure has been detected by a failure detecting part (not shown) or when it has been detected by a battery voltage monitoring part (not shown) that the voltage of the battery BAT is above a permissible upper limit value or is below a permissible lower limit value, a fadeout request signal 131a is supplied to the correcting part 131 from an ignition switch monitoring part (not shown) or the failure detecting part or the battery voltage monitoring part. When a fadeout request signal 131a is supplied to it, the correcting part 131 generates a corrected target current signal ITH in which the target current signal IT supplied from the target current calculating part 121 is gradually reduced and finally reaches zero and supplies this corrected target current signal ITH to the deviation calculating part 127.

When at this time a predetermined voltage is being supplied to the motor current detector 126 and the operation of the motor current detector 126 is normal and the current being supplied to the motor 110 is being correctly detected, the current supplied to the motor 110 is gradually decreased to zero along with the diminishing of the target current signal IT.

However, in the current feedback control type control unit 120D shown in FIG. 7, when the voltage of the battery BAT has fallen to below a voltage range in which the motor current detector 126 can operate normally, the motor current value IM being supplied from the motor current detector 126 may deviate from the current actually being supplied to the motor 110. In particular, even when the performance of the battery BAT has fallen, when the ignition switch IGN is on and the engine is running, because a generator is operating, power within a predetermined voltage range (for example 12 to 14 volts) is supplied from the generator to the various loads. However, when the ignition switch IGN is turned off and the engine stops, because there ceases to be any output of power from the generator and power is supplied to the loads from the battery BAT, if the performance of the battery BAT has fallen, the voltage supplied by the battery may fall (for example to below 8 volts) to far below its nominal voltage (for example 12 volts) and it may become impossible for the motor current detector 126 to correctly detect the value of the motor current.

Consequently, in the control unit carrying out current feedback control, when the ignition switch has been turned off or when it has been detected that the voltage of the battery BAT is above a permissible upper limit voltage or below a permissible lower limit voltage, even if the target current signal IT is corrected and the target current value IT is gradually reduced, if the voltage of the battery BAT has fallen to below the voltage range over which the motor current detector can operate correctly, the motor current IM cannot be detected correctly and because of this the current supplied to the motor 110 cannot be reduced in correspondence with the target current value. Consequently, when the ignition switch is switched off with the steering wheel turned, the steering wheel may move or the steering torque may suddenly increase, disconcerting the driver.

As a countermeasure to this, it is conceivable to improve the motor current detector 126 so that current detection accuracy can be ensured even when the power supply voltage supplied to the motor current detector 126 falls. However, when the current detection accuracy at low voltages (for example 7 to 9 volts) is increased, the current detection accuracy at normal voltages (for example 10 to 14 volts) and high voltages (for example over 14 volts) may fall. And when the range of operating power supply voltages of the motor current detector 126 is increased, the cost of the motor current detector 126 tends to increase.

It is therefore demanded that there be provided an electric power steering apparatus which detects the current supplied to a motor with a current detector and carries out feedback control of that current and makes the steering assist force decrease gradually when stopping the supply of a steering assist force when an ignition switch is switched off or the voltage of a battery power supply has fallen wherein even when an error has arisen in the current value detected by the current detector due to the fall in the voltage of the battery power supply the steering assist force can be suitably reduced and the motor current controlled to zero.

SUMMARY OF THE INVENTION

To achieve this and other objects, the invention provides an electric power steering apparatus comprising: an electric motor, driven by a power supply voltage of a battery supplied through an ignition switch, for applying an assist torque to a steering system; a steering torque detector for detecting a steering torque of the steering system and outputting a steering torque signal; and a control unit having a target current calculating part for calculating a target current that should be supplied to the motor on the basis of the steering torque signal and outputting a target current signal, a motor current detector for detecting a current flowing through the motor and outputting a motor current signal, a deviation calculating part for calculating a deviation between the target current signal and the motor current signal and outputting a deviation signal, a drive control signal generating part for generating a drive current signal on the basis of the deviation signal and generating and outputting a drive control signal for driving the motor on the basis of the drive current signal, and a motor driving part for supplying current to the motor on the basis of the drive control signal, the control unit further comprising a drive signal fading part for gradually decreasing the drive current signal with time.

The drive signal fading part is constructed to gradually decrease the drive current signal with time when an ignition switch is switched off or when the power supply voltage of a battery has fallen to below a predetermined voltage. When the ignition switch is switched off or when the power supply voltage of the battery has fallen to below a predetermined voltage, the drive signal fading part gradually decreases the drive control signal supplied to the motor driving part to zero, and consequently even when there is an error in the motor current detected by the motor current detector, the current supplied to the motor is gradually decreased to zero without feedback control continuing on the basis of this motor current detection error. Therefore, even when the current detection accuracy of the motor current detector falls due to a fall in the battery voltage and an undesirable error arises in the above-mentioned deviation, the steering assist force supplied from the motor can be made to decrease gradually with time to zero.

The control unit may be provided with a target current fading part for gradually reducing the target current signal with time. When the ignition switch is switched off or when the power supply voltage of the battery has fallen to below a predetermined voltage, this target current fading part gradually decreases the target current signal with time. When the target current signal calculated in correspondence with the steering torque is gradually decreased with time by a target current fading part in this way and the drive control signal calculated in correspondence with the above-mentioned deviation is gradually decreased with time by the drive signal fading part, the steering assist force supplied from the motor can be made to gradually decrease with time even when a driver performs a steering operation during the gradual decreasing of the steering assist force (during fade-out control).

BRIEF DESCRIPTION OF THE DRAWINGS

Preferred embodiments of the invention will now be described in detail, by way of example only, with reference to the accompanying drawings, in which.

DETAILED DESCRIPTION OF THE PREFERRED EMBODIMENTS

Figure 1:
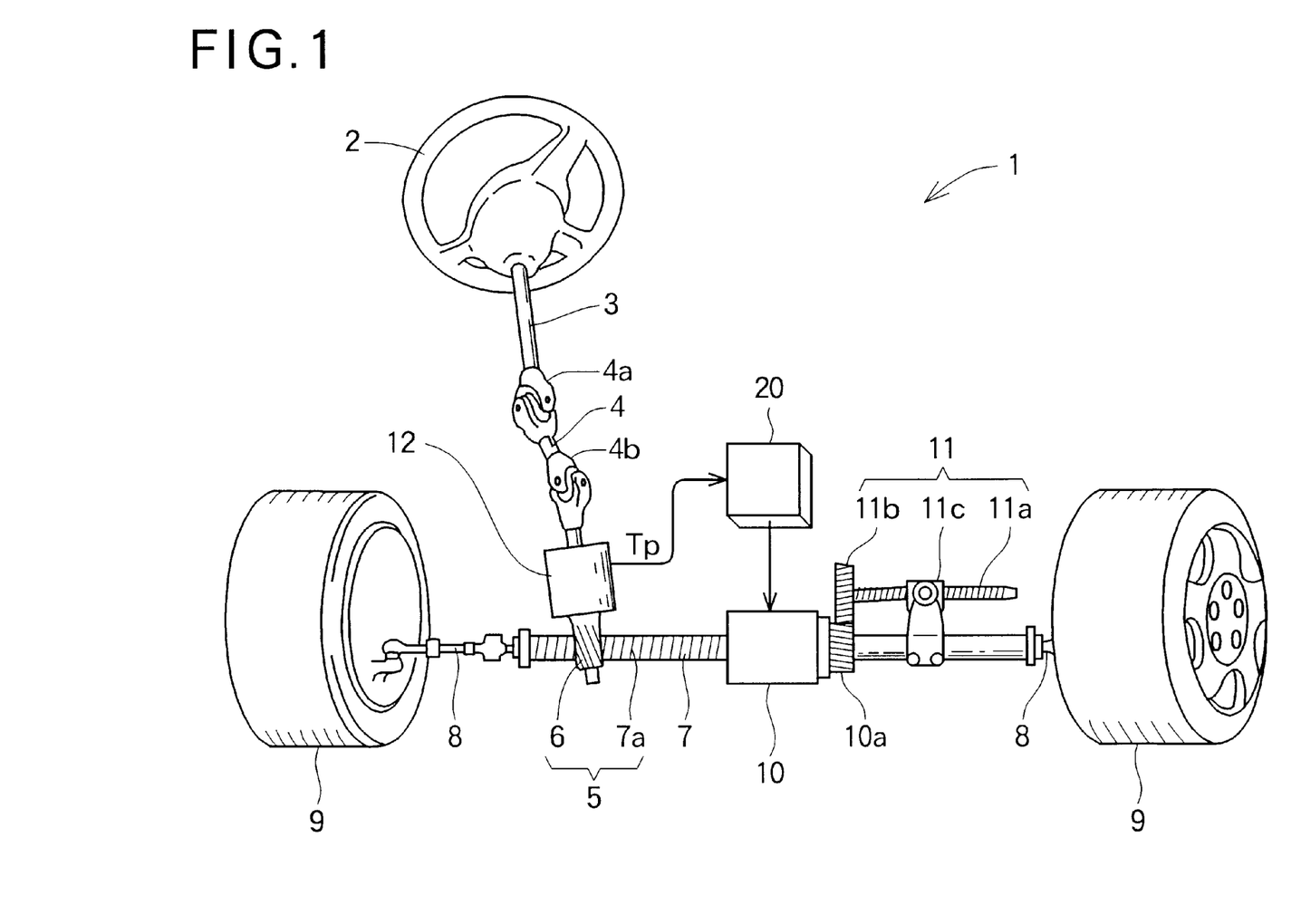
FIG. 1 is a schematic view of an electric power steering apparatus.

Reference is initially made to FIG. 1 which schematically shows an electric power steering apparatus according to the present invention. In the figure, an electric power steering apparatus 1 has a motor 10 in a steering system, and lightens a steering force that must be exerted by a driver by controlling power supplied from the motor 10 using a control unit 20.

A steering shaft 3 connected to a steering wheel 2 is connected by a connecting shaft 4 having universal couplings 4a, 4b to a pinion 6 of a rack and pinion mechanism 5. A rack shaft 7 has rack teeth 71 meshing with the pinion 6. The rack and pinion mechanism 5 converts rotation of the pinion 6 into reciprocating motion of the rack shaft 7. Right and left front wheels 9 are connected to the ends of the rack shaft 7 by tie rods 8. When the steering wheel 2 is turned, the front wheels 9 are turned by way of the rack and pinion mechanism 5 and the tie rods 8. In this way it is possible to change the direction of the vehicle.

To lighten the steering force that must be exerted by a driver, a motor 10 for supplying a steering assist torque is disposed coaxially with the rack shaft 7 and a rotational output of the motor 10 is converted into a thrust force and made to act on the rack shaft 7 by a ball screw mechanism 11 mounted substantially parallel with the rack shaft 7. A helical drive gear 10a is mounted on the rotor of the motor 10. A helical gear 11b mounted on the end of a screw shaft 11a of the ball screw mechanism 11 meshes with the helical drive gear 10a. A nut 11c of the ball screw mechanism 11 is connected to the rack shaft 7.

A steering torque sensor 12 detects a manual steering torque acting on the pinion 6 and supplies a steering torque signal Tp corresponding to the detected steering torque to the control unit 20. The control unit 20 operates the motor 10 on the basis of the steering torque signal Tp and thereby controls the output power of the motor 10 (the steering assist torque).

Figure 2:
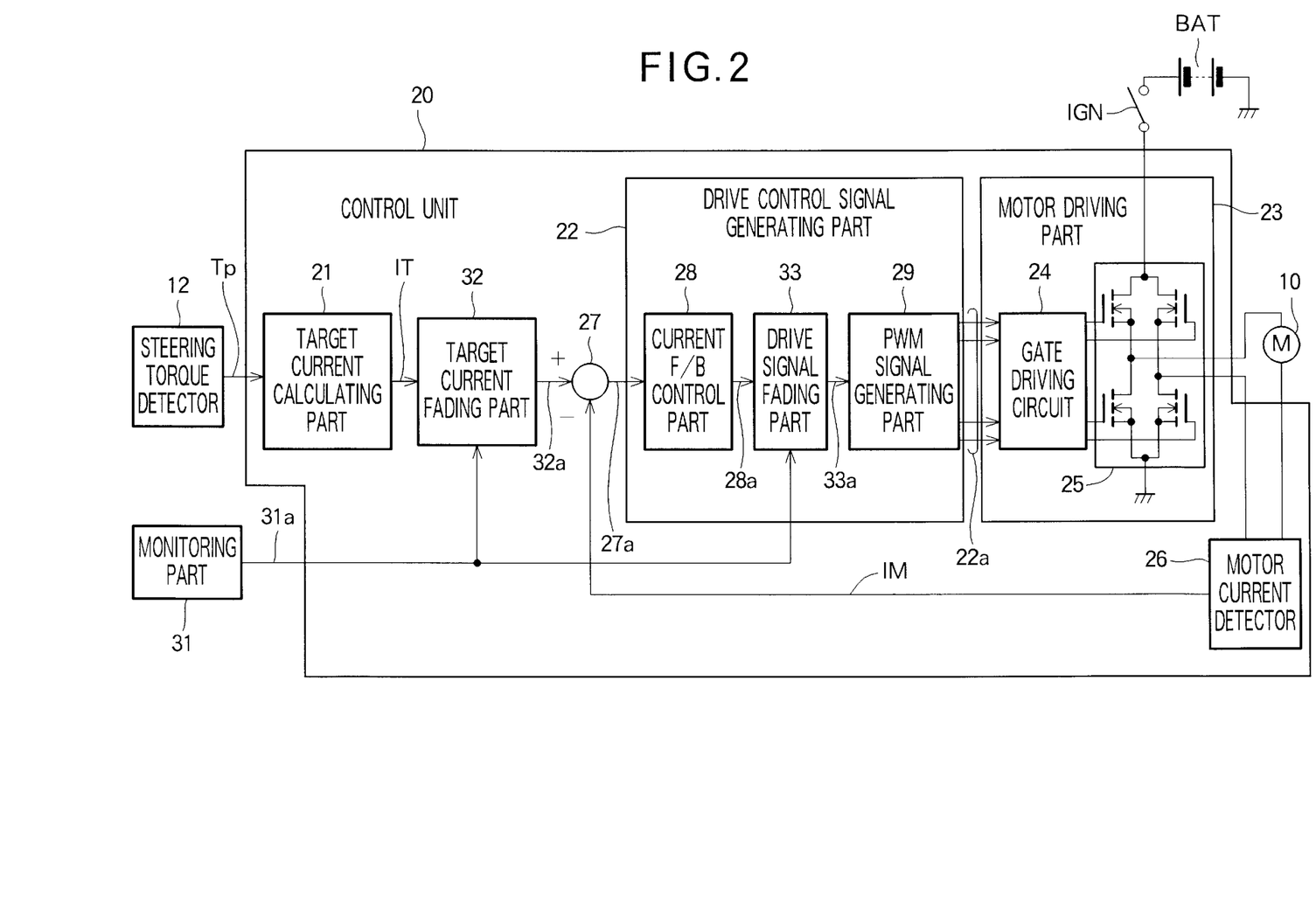
FIG. 2 is a block diagram of a control unit of an electric power steering apparatus according to the invention.

FIG. 2 is a block diagram showing the construction of a control unit of an electric power steering apparatus according to the invention.

Referring to FIG. 2, the control unit 20 is made up of a target current calculating part 21, a target current fading part 32, a deviation calculating part 27, a drive control signal generating part 22, a motor driving part 23 and a motor current detector 26. This control unit 20 consists of the related art control unit 120B shown in FIG. 5 with the target current fading part 32 and a drive signal fading part 33 added.

The target current calculating part 21 calculates a target current that should be supplied to the motor 10 on the basis of the steering torque signal Tp outputted from the steering torque sensor 12 and outputs a target current signal IT. The motor current detector 26 detects the current flowing through the motor 10 and outputs a motor current signal IM. The deviation calculating part 27 calculates the deviation between the target current signal IT and the motor current signal IM and outputs a deviation signal 27a.

The motor driving part 23 has a gate driving circuit 24 and a motor driving circuit 25 consisting of four power field effect transistors connected in an H-type bridge. The gate driving circuit 24 drives the gates of the field effect transistors and thereby drives switching of the field effect transistors on the basis of the drive control signal (a PWM signal) 22a. By this means the control unit 20 PWM-controls power supplied from a battery power source BAT to the motor 10 on the basis of the steering torque signal Tp outputted by the steering torque detector 12 and thereby controls the output power (steering assist torque) of the motor 10.

The reference numeral 31 denotes a monitoring part. This monitoring part 31 has an ignition switch monitoring part and a battery voltage monitoring part and monitors the states of an ignition switch IGN and a power supply voltage and under predetermined conditions, for example when the ignition switch IGN has been switched off or when the power supply voltage of the battery BAT has fallen to below a predetermined value, outputs a fadeout request signal 31a.

The target current fading part 32 is interposed between the target current calculating part 21 and the deviation calculating part 27. The drive signal fading part 33 is interposed between a current feedback control part 28 and a PWM signal generating part 29.

When no fadeout request signal 31a is being supplied to the target current fading part 32, it feeds the target current signal IT supplied to it from the target current calculating part 21 unchanged to the deviation calculating part 27. When on the other a fadeout request signal 31a is being supplied to the target current fading part 32, it generates a fading target current signal (a corrected target current signal) 32a consisting of the target current value of the target current signal IT calculated by the target current calculating part 21 being gradually decreased with time so that it finally becomes zero and supplies the generated fading target current signal (corrected target current signal) 32a to the deviation calculating part 27.

Figure 3A:
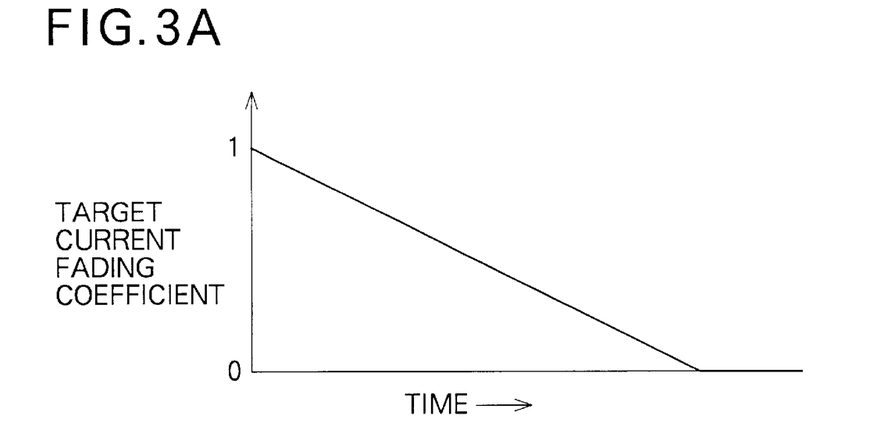
FIGS. 3A, 3B and 3C are graphs illustrating a target current fading operation of a target current fading part and a drive signal fading operation of a drive signal fading part.
Figure 3B:
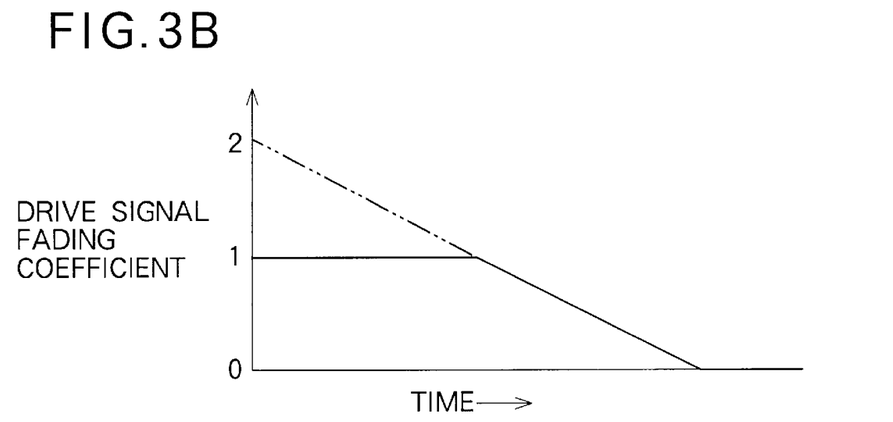
Figure 3C:
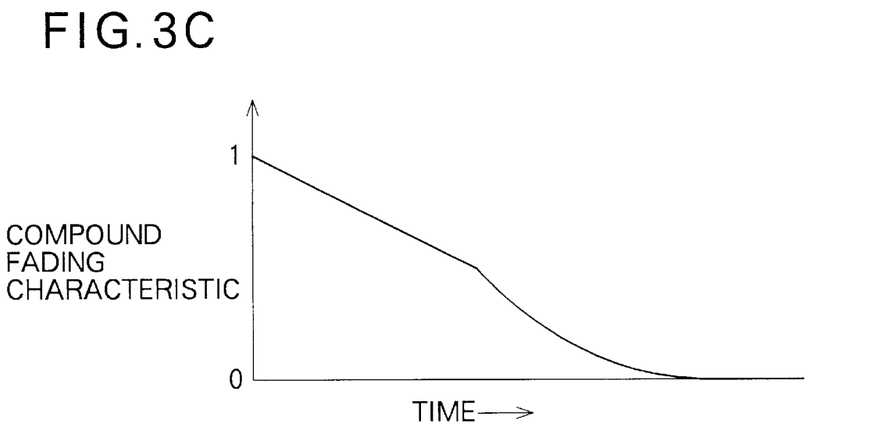

FIGS. 3A, 3B and 3C are graphs illustrating the target current fading operation of the target current fading part and a drive signal fading operation of the drive signal fading part.

FIG. 3A shows the target current fading operation of the target current fading part. The target current fading part 32 shown in FIG. 2 generates the fading target current signal (corrected target current signal) 32a by gradually decreasing with time from one to zero a coefficient (a target current fading coefficient) which it multiplies with the target current value (IT) set by the target current calculating part 21 in correspondence with the steering torque signal Tp.

The target current fading part 32 may alternatively be made up of a target current fading coefficient multiplying part for multiplying the target current value by a coefficient (target current fading coefficient) for fade-correcting the target current value and a coefficient setting part for setting a coefficient (target current fading coefficient) predetermined in correspondence with time elapsed from when the fadeout request signal 31a was supplied. Or the target current fading part 32 may be constructed to repeat a cycle of first outputting a fading target current signal (corrected target current signal) 32a obtained by multiplying the target current value by a coefficient smaller than 1 (for example 0.95) and then after the elapse of a predetermined time outputting a fading target current signal (corrected target current signal) 32a obtained by multiplying the previously outputted fading target current signal (corrected target current signal) 32a by a coefficient smaller than 1 (for example 0.95), and to output zero when the fading target current signal (corrected target current signal) 32a obtained by the multiplication is below a preset value.

Also, although FIG. 3A shows an example wherein the target current value is decreased linearly with time, first the rate of decrease of the target current value may be made small and then the rate of decrease of the target current value may be increased with time so that the rate of decrease is small to start with but gradually increases until the target current value reaches zero. Or, reversely, the target current value may first be decreased at a high rate and then the rate of decrease gradually reduced as the target current value approaches zero.

In FIG. 2 a construction wherein the target current fading part 32 is provided separately is shown, but alternatively a fading correction calculating part for carrying out fading correction of the target current value may be provided inside the target current calculating part 21 and the target current calculating part 21 and the target current fading part 32 thereby constructed integrally.

When no fadeout request signal 31a has been supplied to it, the drive signal fading part 33 supplies a drive current signal 28a outputted from the current feedback control part 28 unchanged to the PWM signal generating part 29. When a fadeout request signal 31a has been supplied to it, the drive signal fading part 33 generates a fading drive current signal (corrected drive current signal) 33a consisting of the drive current value calculated by the current feedback control part 28 being gradually decreased with time so that it finally becomes zero and supplies this fading drive current signal 33a to the PWM signal generating part 29.

FIG. 3B shows an example wherein the drive current value is not fade-corrected immediately from when the fadeout request signal 31a is supplied but rather starts to be gradually reduced after a predetermined time elapses.

That is, in this example, the drive signal fading part 33 shown in FIG. 2 generates the fading drive current signal (corrected drive current signal) 33a by making a coefficient (a drive current fading coefficient) by which it multiplies the drive current signal 28a calculated by the current feedback control part 28 in correspondence with the deviation signal 27a one until a preset time elapses from when the fadeout request signal 31a is supplied and then gradually decreasing the coefficient (drive current fading coefficient) from one to zero with time thereafter.

The drive signal fading part 33 may alternatively be made up of a drive current fade coefficient multiplying part for multiplying the drive current value by a coefficient (drive current fading coefficient) for fade-correcting the drive current value and a coefficient setting part for setting a predetermined coefficient (drive current fading coefficient) corresponding with the elapsed time from when the fadeout request signal 31a was supplied.

Or the drive signal fading part 33 may be constructed to repeat a cycle of first outputting a fading drive current signal (corrected drive current signal) 33a obtained by multiplying the drive current value by a coefficient smaller than 1 (for example 0.95) and then after the elapse of a predetermined time outputting a fading drive current signal (corrected drive current signal) 33a obtained by multiplying the previously outputted drive current fading signal (corrected drive current signal) 33a by a coefficient smaller than 1 (for example 0.95), and to output zero when the fading drive current signal (corrected drive current signal) 33a obtained by the multiplication is below a preset value.

Also, although FIG. 3B shows an example wherein the drive current value is decreased linearly with time after the elapse of a predetermined time from when the fadeout request signal 31a is supplied, first the rate of decrease of the drive current value may be made small and then the rate of decrease of the drive current value may be increased with time so that the rate of decrease is small to start with but gradually increases until the target current value reaches zero. Or, reversely, the drive current value may first be decreased at a high rate and then the rate of decrease gradually reduced until the drive current value reaches zero.

In FIG. 6, a construction wherein the drive signal fading part 33 is provided separately is shown, but alternatively a fading correction calculating part for carrying out fading correction of the drive current value may be provided inside the current feedback control part 28 and the current feedback control part 28 and the drive signal fading part 33 thereby constructed integrally. Or, an operating coefficient changing part for changing operating coefficients carrying out operations such as proportional, integral and differential operations with time elapsed from when the fadeout request signal 31a is supplied so that the drive current value that is the result of these operations gradually decreases and a forced zero outputting part for making the drive current value zero when the calculated drive current value falls below a preset value may be provided inside the current feedback control part 28 and the current feedback control part 28 and the drive signal fading part 33 thereby constructed integrally.

Or, a duty change forcing part for decreasing with time the duty of the outputted PWM signal from when the fadeout request signal 31a is supplied may be provided inside the PWM signal generating part 29 and the drive signal fading part 33 and the PWM signal generating part 29 thereby constructed integrally.

Or, the drive signal fading part can be provided by disposing a duty change forcing part for gradually decreasing the duty of the PWM signal outputted from the PWM signal generating part 29 with time elapsed from when the fadeout request signal 31a is supplied between the PWM signal generating part 29 and the gate driving circuit 24.

In the preferred embodiment shown in FIG. 2, a construction wherein two fading systems, the target current fading part 32 and the drive signal fading part 33, are provided is shown, but alternatively the target current fading part 32 may be dispensed with and only the drive signal fading part 33 provided.

Also, although the preferred embodiment shown in FIG. 2 has a construction is wherein when the target current signal IT changes during fadeout control the fading target current signal (corrected target current signal) 32a outputted from the target current fading part 32 also changes in correspondence with the change in the target current signal IT, the target current value may alternatively be gradually decreased toward zero from the target current value (IT) being outputted from the target current calculating part 21 at the time when the fadeout request signal 31a is supplied.

Although the preferred embodiment shown in FIG. 2 has a construction wherein when the drive current signal 28a changes during fadeout control the fading drive current signal (corrected drive current signal) 33a outputted from the drive signal fading part 33 also changes, the drive signal fading part 33 may alternatively be constructed to gradually decrease the drive current value toward zero from the drive current value being outputted from the current feedback control part 28 at the time when the fadeout request signal 31a is supplied.

As shown in FIG. 3A and FIG. 3B, the time (fadeout time) taken for the target current fading part 32 to bring the target current fading coefficient to zero and the time (fadeout time) taken for the drive signal fading part 33 to bring the drive signal fading coefficient to zero are made the same.

As described above, because the control unit 20 in an electric power steering apparatus according to the invention has the drive signal fading part 33 for gradually decreasing the drive control signal with time when the ignition switch IGN is switched off and the supply of a steering assist force is consequently stopped or when the supply of a steering assist force is stopped because the voltage of the battery power supply has fallen, even when an error arises in the motor current signal IM outputted from the motor current detector 26 because the power supply voltage of the battery BAT has fallen and as a result an error arises in the drive current calculated in the current feedback control part 28, problems such as current continuing to be supplied to the motor 10 because of this error do not occur and the current supplied to the motor 10 is gradually decreased with time to zero without fail.

Also, because the control unit 20 has two fading parts, the target current fading part 32 and the drive signal fading part 33, when fadeout control is carried out the decrease characteristic of the target current value and the decrease characteristic of the motor current actually supplied to the motor 10 on the basis of current feedback control can each be set to a desired characteristic, and by the two decrease characteristics being compounded as shown in FIG. 3C it is possible to reduce the motor current to zero with compounded decrease characteristics having different decrease rates.

Therefore, when the steering assist force supplied from the motor 10 is decreased to zero, the steering assist force can be reduced to zero in such a way that the driver experiences no disconcerting feeling.

As described above, because an electric power steering apparatus according to the invention has a drive signal fading part for gradually decreasing a drive control signal with time, when fadeout control to gradually decrease a steering assist force is being carried out as the supply of steering assist force is stopped because the ignition switch has been switched off or the voltage of the battery power supply has fallen, even if there is an error in the motor current detected by the motor current detector, because feedback control is not continued on the basis of that motor current detection error and the current supplied to the motor is decreased to zero without fail, the steering assist force can be gradually decreased without the steering feeling being impaired.

Also, because as well as the drive signal fading part an electric power steering apparatus according to the invention has a target current value fading part for gradually decreasing the target current signal with time, even when the driver performs a steering operation during fading of a steering assist force (fadeout control), the steering assist force can be gradually decreased after having been changed in correspondence with that steering operation so that the steering feeling is not made disconcerting, and furthermore decrease characteristics having different rates of decrease with respect to time can be realized easily by the decrease characteristics of the different fading parts being combined. Consequently, it is possible to fade out a steering assist force without impairing the steering feeling.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An electric power steering apparatus comprising:

an electric motor, driven by a power supply voltage of a battery supplied through an ignition switch, for applying an assist torque to a steering system;

a steering torque detector for detecting a steering torque of the steering system and outputting a steering torque signal; and a control unit having a target current calculating part for calculating a target current to be supplied to the motor on the basis of the steering torque signal and outputting a target current signal, a motor current detector for detecting a current flowing through the motor and outputting a motor current signal, a deviation calculating part for calculating a deviation between the target current signal and the motor current signal and outputting a deviation signal, a drive control signal generating part for generating a drive current signal on the basis of the deviation signal and generating and outputting a drive control signal for driving the motor on the basis of the drive current signal, and a motor driving part for supplying current to the motor on the basis of the drive control signal, the control unit further comprising a drive signal fading part for gradually decreasing the drive current signal with time.

2. An electric power steering apparatus according to claim 1, wherein the drive signal fading part gradually decreases the drive current signal with time when the ignition switch is switched off and when the power supply voltage of the battery falls below a predetermined voltage.

3. An electric power steering apparatus according to claim 1, wherein the control unit further comprises a target current fading part for gradually decreasing the target current signal with time.

4. An electric power steering apparatus according to claim 3, wherein the target current fading part gradually decreases the target current signal with time when the ignition switch is switched off and when the power supply voltage of the battery falls below a predetermined voltage.

* * * * *